United States Patent [19]
Kent

[11] Patent Number: 5,973,699
[45] Date of Patent: Oct. 26, 1999

[54] SYSTEM AND METHOD FOR INCREASING THE PERFORMANCE FOR REAL-TIME RENDERING OF THREE-DIMENSIONAL POLYGONAL DATA

[75] Inventor: James R. Kent, Powell, Ohio

[73] Assignee: Platinum technology IP, inc., Oakbrook Terrace, Ill.

[21] Appl. No.: 08/716,543

[22] Filed: Sep. 19, 1996

[51] Int. Cl.$^6$ .................................................. G06T 17/00
[52] U.S. Cl. ............................................................. 345/419
[58] Field of Search .................................. 345/418, 419, 345/420, 421, 423

[56] References Cited

U.S. PATENT DOCUMENTS

| 5,761,391 | 6/1998 | Sato et al. ................................ 345/419 |
| 5,771,341 | 6/1998 | Huddy ..................................... 345/419 |
| 5,781,229 | 7/1998 | Zediker et al. .......................... 345/419 |
| 5,798,761 | 8/1998 | Isaacs ...................................... 345/419 |

OTHER PUBLICATIONS

Kent, James, *VRML and WebSpace 3D Navigation Interfaces for the World Wide Web*, Proceedings of Imagina '96, Feb. 21–23, 1996 (8 pages).

A High–Speed 3D Web Browser" by Jean–Francis Balaguer and Enrico Gobbetti" Center for Advanced Studies, Research and Development in Sardinia, Via Sauro, 10 I–09123 Cagliari, Proc. VRML' Dec. 1995. (15 pages).

Funkhouser, Thomas et al., Adaptive Display Algorithm for Interactive Frame Rates During Visualization of Complex Virtual Environments, pp. 247–254, Computer Graphics Proceedings, Annual Conference Series, Aug. 1–6, 1993.

Rohlf, John et al., IRIS Performer: A High Performance Multiprocessing Toolkit for Real–Time 3D Graphics, pp. 381–394, Computer Graphics Proceedings, Annual Conference Series, Jul. 24–29, 1994.

*Primary Examiner*—Phu K. Nguyen
*Assistant Examiner*—Cliff N. Vo
*Attorney, Agent, or Firm*—Fish & Richardson P.C.

[57] ABSTRACT

A process for optimally rendering 3D worlds so that a sufficiently detailed representation of the 3D world is displayed at a frame rate that provides fluidity of motion while maintaining enough context of the world to enable user interaction. A data structure is computed that contains information about how the world is spatially organized. The 3D world is divided into a non-uniform subdivision grid in each of the three dimensions. Each element in the data structure represents one 3D rectangular cell within the spacial subdivision. Each element stores a list of all the objects in the world which occupy any portion of the 3D cell represented by the data element. The subdivision grid and the array are used to determine which portions of the scene are most visually important to the user. An imaginary ray is cast into the subdivision grid from the viewer's perspective along the viewer's line of sight. The first objects rendered are those within the first cell the ray intersects. The next objects that are rendered are those within the second cell the ray intersects. This continues until all objects within each cell that the ray intersects are rendered. Next, objects that are within cells adjacent to each intersecting cell are rendered. This is followed by rendering objects that are two cells away, and so on, until all object are rendered or the allotted time to render a single frame has expired.

32 Claims, 9 Drawing Sheets

FIG. 4 - Constructing the Subdivision Grid

FIG. 5 - Determining the Order of Rendering

FIG. 6 The Subdivision Grid in Three Dimentions

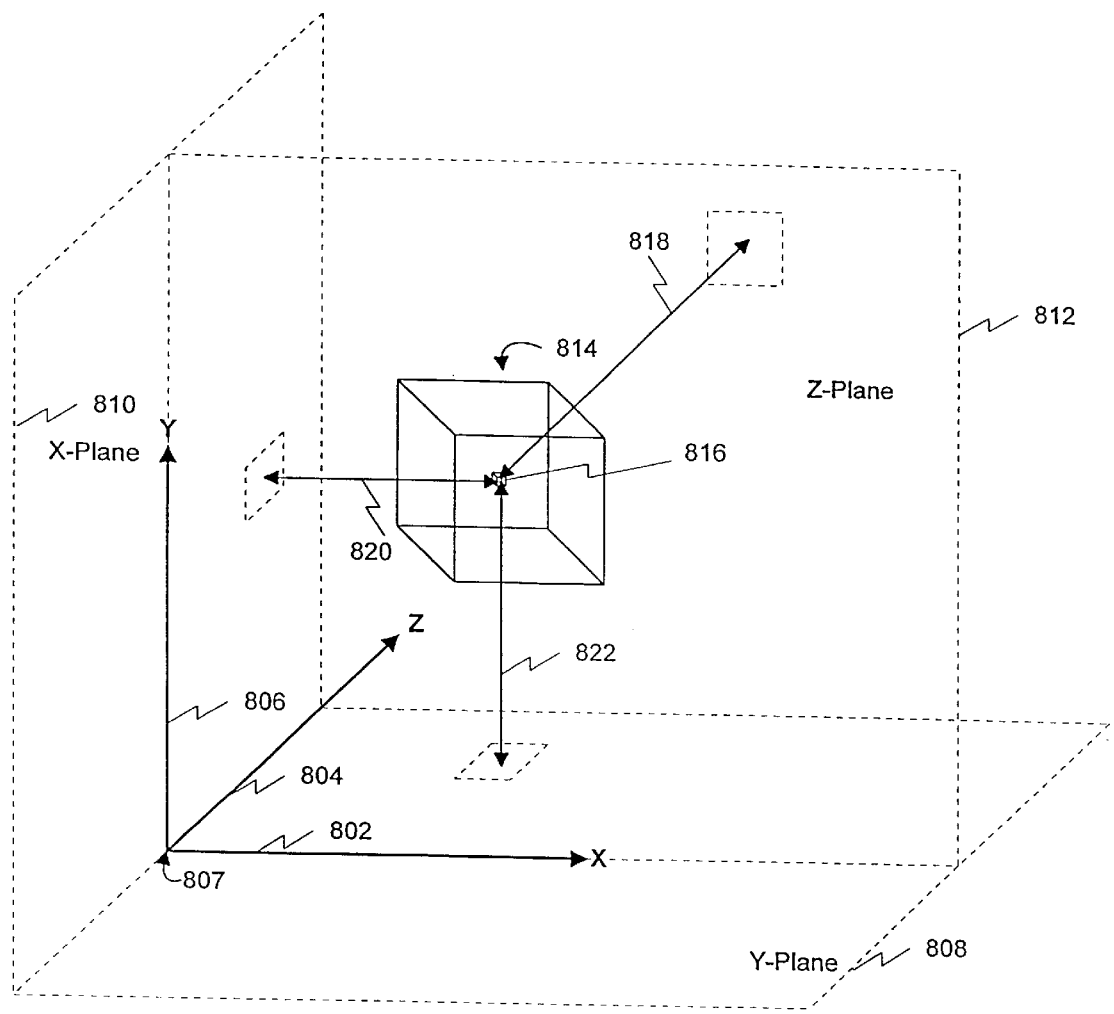
FIG. 8 3D World Coordinate System

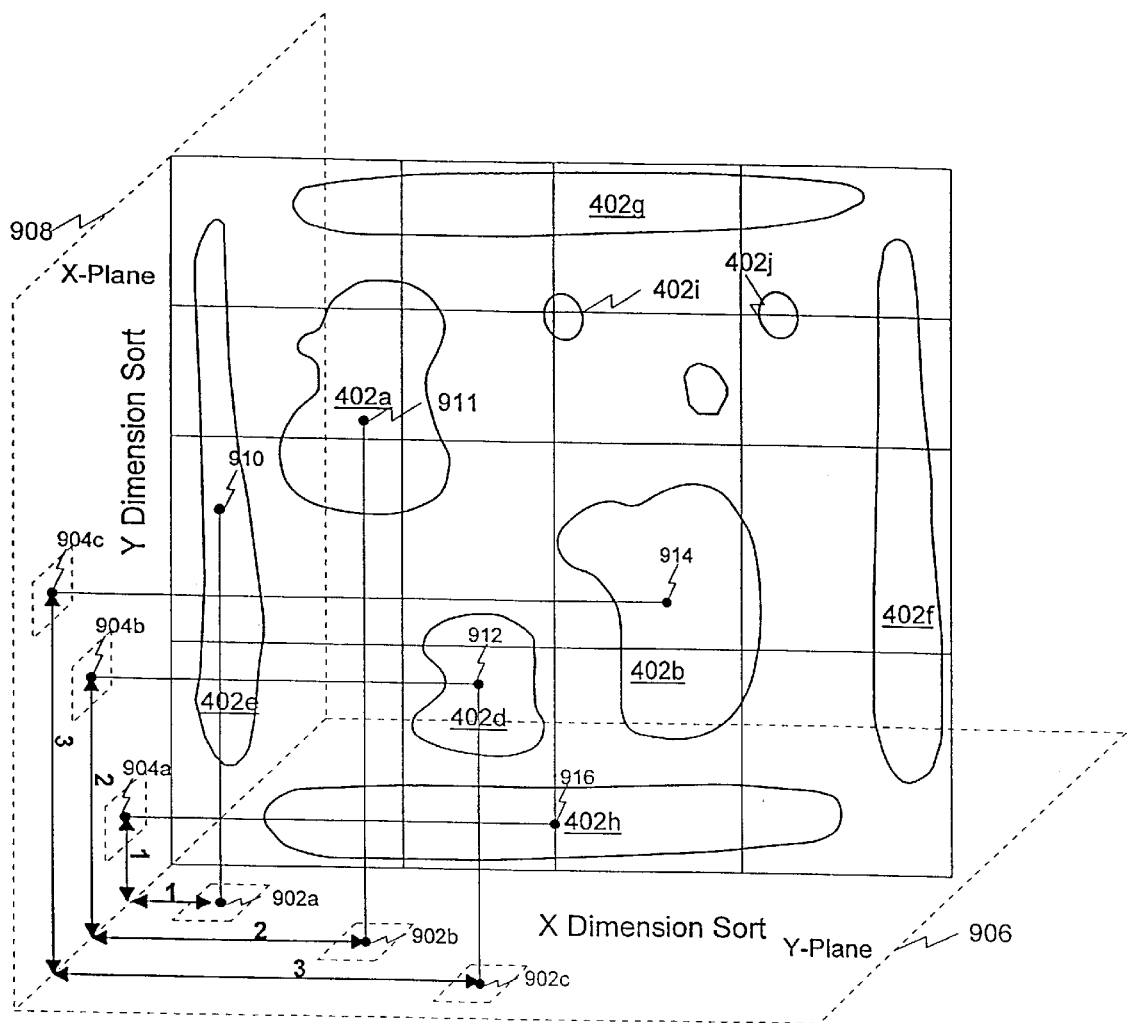
FIG. 9 Sorting the object lists

SYSTEM AND METHOD FOR INCREASING THE PERFORMANCE FOR REAL-TIME RENDERING OF THREE-DIMENSIONAL POLYGONAL DATA

BACKGROUND OF THE INVENTION

1. Field of the Invention

The present invention relates generally to 3D modeling systems and more specifically to a system and process for increasing the performance for real-time rendering of 3D polygonal data.

2. Related Art

In just a few short years since its emergence on the Internet, the world wide web (WWW) has revolutionized the way many people communicate with each other and interact with commercial, governmental and educational entities. Before the emergence of the world wide web, the Internet was predominantly used by governmental, scientific and academic communities. Since its introduction however, the Internet has experienced unprecedented growth and has become a cultural phenomenon that is used on a regular basis by mainstream populations throughout the world.

The Internet has been transformed from a cryptic command line, text based environment into a user-friendly, easily navigable 'cyber space' filled with colorful graphical images, high quality sounds and full motion video. Anyone can navigate through the world wide web by simply pointing and clicking with a mouse or other pointing device, such as a trackball, touchpad, or electronic pen. This transformation has led to an abundance of new Internet subscribers and Internet providers.

The transformation of the Internet has been accomplished for the most part, through the use of a standard script language used by Internet sites known as hypertext markup language (HTML). HTML provides a unified interface to text and multimedia data. HTML provides a means for anyone with a text editor to create colorful 'Web pages' which can be viewed seamlessly by Internet subscribers around the world. HTML sites are viewed through the use of a tool known as a browser which enables one to explore the contents of databases located throughout the world without needing to be concerned about the details of the data format.

Browsers download and interpret the HTML provided by Web sites and presents them as 'pages' on local display devices. Each HTML page can contain text, graphics and hypertext links to other HTML pages. Each page has a unique Internet address which is referred to as a Uniform Resource Locator (URL).

Thus, when a user clicks on a hypertext link a new URL is fetched by the browser and downloaded to the user's workstation. The previous web page is replaced by a new web page that is defined by the HTML provided by the new URL. Generally hypertext links are depicted as underlined or highlighted words, depending on the browser's implementation of the HTML. Hypertext links can also appear as buttons or other graphical images. In addition the shape of the cursor changes when the pointer passes over a hypertext linked screen object. For example, a cursor having the shape of an arrow may change into the shape of a hand when positioned over a hypertext link.

Each time a new web page is loaded, via a URL, a new HTML document must be downloaded or fetched, and displayed or rendered by the browser. The amount of time it takes to fetch and display each new web page depends upon the size of the new web page and the complexity of the content contained therein. However, users can typically interact with a web page before all of its contents is downloaded and/or rendered by the browser. HTML documents generally contain 'Inlined' resources which are not downloaded immediately, but allow immediate user interaction. For example, the graphics for a button may be defined by an Inlined image. Before the image is downloaded by the browser, an empty rectangle representing the boundary of the Inlined image is drawn. At this point, the user may click on the empty rectangle before its image is rendered on the screen.

A new scripting language which promises to further revolutionize the WWW has recently appeared on the Internet. This new language is called virtual reality modeling language (VRML). VRML documents are used to create three dimensional (3D) infinitely scalable, virtual worlds on the Web. The goal of these worlds is to provide convincing simulations of 3D environments which visitors may explore. Similar to the way HTML operates, VRML documents are downloaded from VRML web sites into local computer systems by VRML browsers. The VRML browsers interpret the scene (also referred to herein as a 'world' or 'model') that is described by the VRML file and renders the resulting images on the local display device. VRML also uses Inlined models.

3D rendering is performed from the viewpoint of a virtual camera that has the ability to move and tilt in any direction in response to user input, via a mouse, keyboard or other input device. In addition, objects within a 3D world can be examined and manipulated by a user. An object is a collection of polygons. More specifically, in VRML an object is a single shape, such as a cube or sphere, or a group of shapes. Further, like HTML, VRML documents can provide links to other VRML worlds and/or HTML Web pages through the use of URL links.

The use of VRML enables Internet users to navigate through three dimensional worlds in real-time. 3D environments are being used to augment the information gathering experience of Internet users. For example, a user can navigate through the streets of a city and hyper link to a particular company's home web page by clicking on the company's building site. Other examples include on-line virtual shopping, museum browsing and corporate briefing centers. VRML also allows users to experience worlds that have no physical counterpart and are not constrained by physical restrictions due to size, location, time, or safety. Such worlds need not even obey the laws of physics that govern our everyday lives.

Although such 3D modeling on the Internet represents a substantial improvement in the overall Internet experience, many problems are still to be overcome if the use of VRML is to be accepted on a wide scale basis. For example, in order to be useful, VRML 3D worlds must be rendered at interactive frame rates. That is, each frame on the local display must be rendered within a certain period of time in order to provide the illusion of fluid movement and interaction within the 3D world. This is a difficult requirement because rendering images of 3D scenes takes a substantial amount of computer processing power. Moreover, many Internet connections are established using low-end computer equipment which lacks the rendering capabilities and processing power found in many high-end graphic work stations. Thus, not only is it desired to provide VRML 3D worlds with interactive frame rates, but it is desired to provide such rates using affordable PC technology. Unfortunately, for some large virtual environments there is simply too much data to render 3D worlds at interactive frame rates using affordable PC technology.

Conventionally there have been attempts to speed up the rendering process. Such attempts fall into two general categories. The first category involves creating data structures to represent the spatial structure of the scene, then using this knowledge of the spatial organization of the scene to accelerate its rendering. The second category attempts to reduce the complexity (i.e., the number of polygons) in the scene by replacing detailed models of objects with simpler representations. This is known as the level of detail (LOD) technique.

An example of the first category can be found in the paper by Thomas A. Funkhouser and Carlo H. Sequin Adaptive Display Algorithm for Interactive Frame Rates During Visualization of Complex Virtual Environments (Proceedings of SIGGRAPH '93). This paper describes an algorithm that takes a model of a world, and first preprocesses it to create an auxiliary data structure known as a binary space partitioning tree (BSP tree). The BSP tree is used when rendering the scene to determine exactly what polygons of the scene are potentially visible. Only the potential visible polygons of the scene are rendered.

This process works well because it only renders those polygons that are potentially visible. It works particularly well for architectural models of the interiors of buildings, because the majority of polygons are obscured by walls. However, the process has many drawbacks which makes it inappropriate for use with real-time VRML browsers.

This conventional process is very demanding in terms of processing power, and thus only performs well on multi-processor systems. Although determining what polygons are visible is efficient using the BSP tree, the computational time is not negligible. As a result, the implementation described in the paper above requires at least a dual processor system wherein one processor is used to compute visibility, while the other processor is used to render the polygons.

Additionally, the time required to build the BSP tree is prohibitive. For even relatively complex worlds, it can take hours to compute the data structure. Thus, this technique is used to render 3D 'walk through' views of architectural designs and the like, where the BSP tree can be computed off-line, before the walk through takes place.

Further, all the data for the world must be available before the BSP tree can be computed. If a new Inlined portion of the world were added, the entire BSP tree would need to be recomputed, which as stated, can take several hours.

Still further, all visible polygons are rendered. For low to average performance CPUs, even just rendering the visible polygons is too slow to guarantee a reasonable interactive frame rate for moderately complex worlds.

Finally, although this conventional method works well for worlds representing the interior of buildings, it does not work well for exterior worlds because there are no walls to limit the number of polygons that are visible.

An example of a proposed solution in the second category can be found in the paper by John Rohlf and James Helman (Proceedings of SIGGRAPH '94) RISI Performer: A High Performance Multiprocessing Toolkit for Real-Time 3D Graphics Proceedings of SIGGRAPH '94). This paper describes a process for dynamically selecting the level of detail used to represent the models in a scene based upon the system load. That is, if the system load is high, a lower level of detail is selected. However, even at the lowest level of detail, there may still not be enough time to render some 3D worlds at interactive frame rates.

Thus, what is needed is a method for rendering 3D worlds while maintaining interactive frame rates, even if the 3D world contains too much data to render in a given frame period. Further, what is needed is a solution that can be used with all types of computer equipment, including low-end single processor systems.

SUMMARY OF THE INVENTION

Accordingly, the present invention is directed toward a process for optimally rendering 3D worlds so that a sufficiently detailed representation of the 3D world is displayed at a frame rate that provides fluidity of motion while maintaining enough context of the world to enable user interaction.

According to the invention, a data structure is computed that contains information about how the world is spatially organized. The data structure is based upon the size and location of the objects within the world.

The 3D world is divided into a non-uniform grid in each of the three dimensions, X, Y and Z. Each element in the data structure represents one 3D rectangular cell within the spacial subdivision. Each element stores a list of all the objects in the world which occupy any portion of the 3D cell represented by the data element.

Once the subdivision grid has been computed, it is used to determine which portions of the scene are most visually important to the user. That is, which portions of the scene provide the most perceptual clues to the user for navigation. The objects that are most visually important are rendered first, thereby allowing user interaction as quickly as possible. Different methods may be used to determine the visual importance of scene elements. For example, in one implementation, objects in the center of the user's field of view are considered to be more important than objects in the periphery. In this case, those objects that are closer to the center of the user's field of view are rendered before objects that are further away from center.

Thus, once a VRML file has been fetched, a 3D non-uniform subdivision grid is computed that completely encloses the objects in the scene. Once the subdivision grid is completed, a 3D array is constructed. The 3D array comprises one array element for each cell in the grid. Each element contains a list of all of the objects wholly or partially contained in the corresponding cell.

The subdivision grid is used to determine the order in which the objects are rendered during each frame. An imaginary ray is cast into the grid, from the viewer's perspective along the viewer's line of sight. The first objects rendered are those within the first cell the ray intersects. The next objects that are rendered are those within the second cell the ray intersects. In one implementation, this continues until all objects within each cell that the ray intersects are rendered.

After each object within each intersecting cell is rendered, objects that are within cells adjacent to each intersecting cell are rendered. This is followed by rendering objects that are two cells away, and so on, until all objects are rendered or the allotted time to render a single frame has expired.

FEATURES AND ADVANTAGES

One feature of the present invention is that it provides a perception of increased performance for rendering interactive 3D worlds in a real-time fashion.

One advantage of the present invention is that the technique provided requires minimum computer processing power. Thus, the present invention can be used with various types of computer equipment including common low-end personal computers having a single multiprocessor unit.

Another feature of the present invention is that the amount of time to preprocess a 3D world is comparable to the time it takes to download the data for the world. Thus, the present invention can be used with Internet applications such as VRML browsers and the like.

Yet another feature of the present invention is that the technique provided does not require the immediate availability of all of the data which represents a 3D world. Thus, the present inventions can be used with VRML data files containing Inlined data portions which become available asynchronously, while a world is being rendered.

Further features and advantages of the invention, as well as the structure and operation of various embodiments of the invention, are described in detail below with reference to the accompanying drawings. In the drawings, like reference numbers generally indicate identical, functionally similar, and/or structurally similar elements.

BRIEF DESCRIPTION OF THE FIGURES

The present invention will be described with reference to the accompanying drawings, wherein:

FIG. 8 is a block diagram depicting an example of a 3D world coordinate system which can be used with an implementation of the present invention; and FIG. 9 is a block diagram depicting an example of a sorting technique according to a preferred embodiment of the present invention.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is directed toward a process for optimally rendering 3D worlds so that a sufficiently detailed representation of the 3D world is displayed at a frame rate that provides fluidity of motion while maintaining enough context of the world to enable user interaction therein. This increases the user's perception of performance because a user can begin interacting with the most visually important portions of the scene while other portions of the scene are in the process of being rendered.

Figure 1:
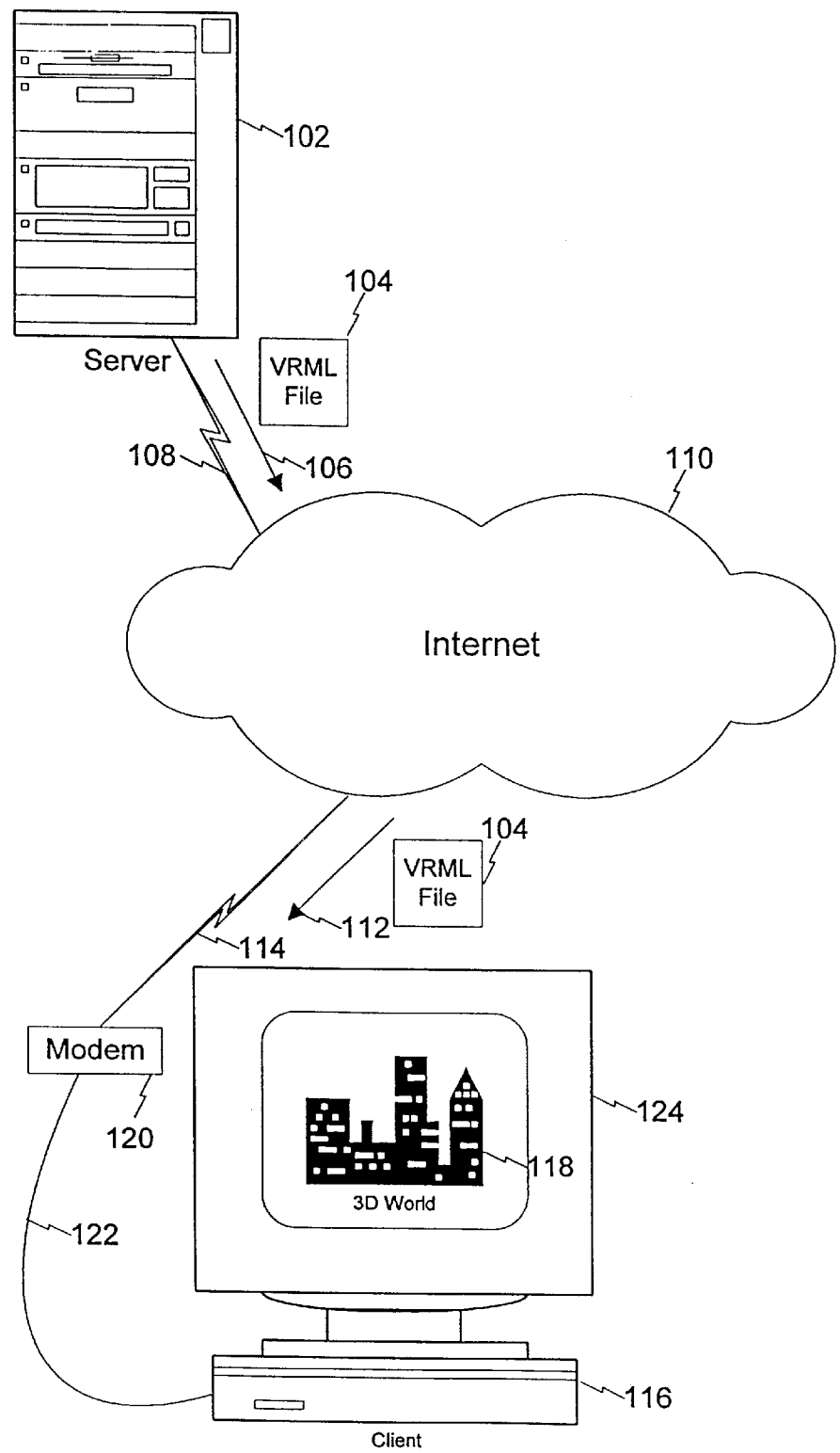
FIG. 1 is a block diagram of an Internet web server and client in a typical environment according to an embodiment of the present invention.

FIG. 1 depicts an Internet web server and client in a typical environment according to an embodiment of the present invention. Note that this is one example of an environment that can be used with the present invention. The server 102 is connected to a network, such as the Internet 110, via the transmission line 108. In this example, the client 116 is connected to the Internet 110 via a standard telephone line 114, which is coupled to a modem 120. The modem 120 is coupled with a client computer system 116 via a serial cable 122. Typically, the data transfer capacity of the client is lower than the data transfer capacity of the server. For example, for an Internet connection using a typical commercial off the shelf analog modem over standard telephone lines, the data transfer speed of the modem is about 28,800 bits per second.

In this example, descriptions of 3D worlds are provided by the server 102 via a VRML data file 104. Note that this is one example of a method used to describe 3D worlds that can be used with the present invention. Other methods that are used to model and describe 3D worlds can also be used with the present invention. As such, the examples used herein should not be construed to limit the scope of the present invention.

The VRML data file 104 is fetched, or downloaded from the server 102 to the client 116, as depicted by the arrows 106 and 112 respectively. The client 116 then interprets the VRML data file using a VRML browser program (not shown) which interprets the VRML and renders the 3D world 118 on the video screen 124.

VRML models are defined as a collection of nodes that are arranged in a tree structure hierarchy called a scene graph. Attributes of the model, such as geometry and color are described by property nodes. For example, a Sphere node creates a spherical object, and a Translation node causes objects to be translated by a specified amount. Detailed descriptions of the VRML 1.0 specification and the concepts upon which it is based can be found in the following publications: M. Pesce, G. Bell, and A. Parisi, VRML 1.0 specification http://vrml.wired.com/vrml.tech/vrml103.html, 1995; M. Pesce, *VRML Browsing and Building Cyberspace*, New Riders Publishing, Indianapolis, 1995; and J. Wernecke, *The Inventor Mentor*, Addison-Wesley, Reading, Massachusetts, 1994.

Note that for simplicity, the examples used herein refer to a 2D world rather than a 3D world. However, after reading this description, it will become apparent to a person skilled in the relevant art(s), how to apply the concepts and principles to 3D worlds by extending them into a third dimension. As such, the examples used herein should not be construed to limit the scope of the present invention which is contemplated to be used for rendering 3D worlds.

Figure 2:
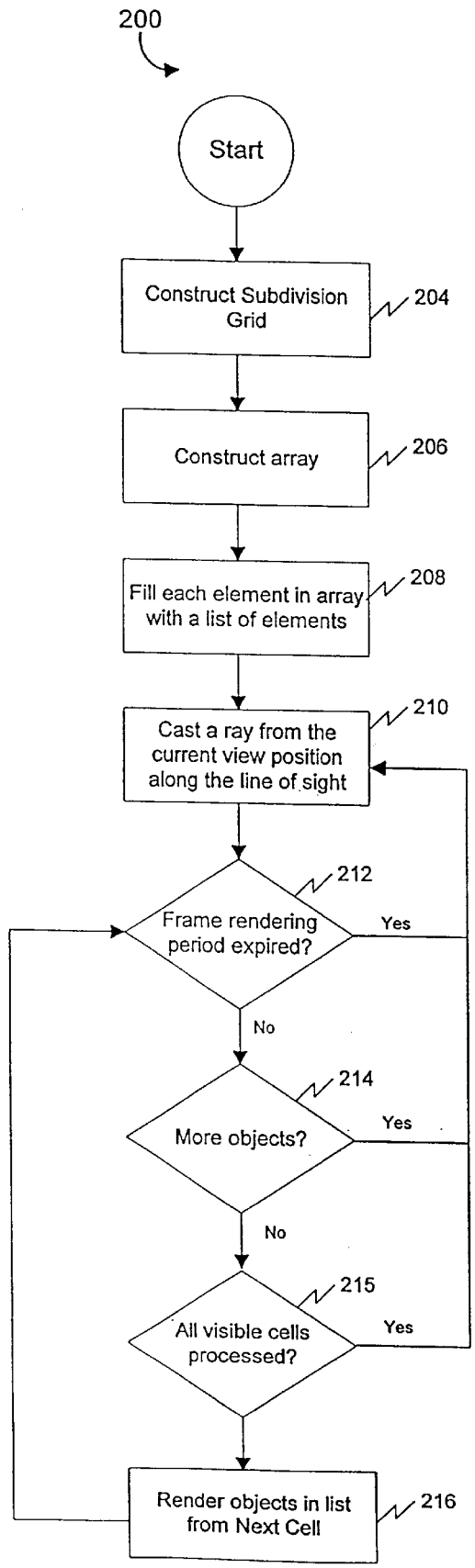
FIGS. 2 and 3 are flowcharts illustrating processes that can be used to implement the rendering techniques according to a preferred embodiment of the present invention.

FIG. 2 is a flowchart of a process that can be used to implement the rendering techniques according to a preferred embodiment of the present invention. The process begins with step 204, where a subdivision grid is constructed that completely encloses the objects in the world scene. Note that the subdivision grid may be non-uniform depending on the size of the world in each dimension, as described below.

Also note that the subdivision grid and rays (as described below) are not actually 'drawn' into the memory space representing the 3D world. Instead, these objects are represented internally, and are mathematically superimposed upon the 3D world. The internal representations of the grid and the rays are constructed using the same alignment and coordinate system of the 3D world. Hence, objects in the 3D world are easily mapped to the internal representations, and vice versa. Techniques using such internal representations to mathematically superimpose objects upon other objects are well known. Thus, after reading the instant disclosure, applying such techniques to an embodiment of the present invention will be apparent to those skilled in the relevant art(s).

Details of step 204 for constructing a subdivision grid according to one embodiment of the present invention, are depicted in the flowchart in FIG. 3 and is described in detail below. In addition, examples of subdivision as grids are described below with references to FIGS. 4 and 6.

Next, in step 206 an array is constructed, wherein each element in the array corresponds with one cell in the subdivision grid. In step 208 each element in the array is assigned a list of objects that appear in the corresponding subdivision cell, as described below.

In step 210 a ray is cast from the current viewer's position along the viewer's line of sight. As described below, the ray is used to determine the order in which objects in the 3D world are rendered. In general, objects that are closer to the ray are rendered before objects that are further away. Next, in step 212, the process determines whether the maximum frame period has expired.

A positive answer to this query indicates that the time has expired for rendering a particular frame, and a new frame rendering period should begin. Thus, control passes back to step 210, where a new ray is cast according to the current viewing position.

Next, in step 214, the process 200 determines if there are any more objects to be rendered. A negative answer to this query indicates that all objects in the world have been rendered already, and a new frame rendering period could begin. Thus, control passes back to step 210, where a new ray is cast according to the current viewing position, and a new frame is processed as described below.

Next, in step 215, the process determines if all cells within the viewing angle, as defined by the field of view lines 504b and 504c (described below), have been rendered. A positive answer to this query indicates that all objects within the visible cells have been rendered already, and a new frame rendering period could begin. Thus, control passes back to step 210, where a new ray is cast according to the current viewing position, and a new frame is processed as described below.

If the process in steps 212, 214, and 215 determines that the frame rendering period has not expired and there are still objects to be rendered, control passes to step 216. In step 216 the process 200 renders objects from the next cell. The determination of the next cell depends upon the prioritizing techniques used with each specific implementation of the present invention. However, as described below, the determination of the next cell to render is related to the distance of the cell from the ray casted in step 210. An example of a technique to determine the next cell to be rendered is described below with reference to FIG. 5.

Note that step 212 insures that the minimum frame rate, as described below, is maintained, even if there is too much data to be rendered during a particular frame rendering period. As can be seen by step 212, if the maximum frame rendering period has expired, the process continues to render the next frame. Thus, if there is not enough time in a frame period to render all of the objects in the 3D world, some of the objects will not be rendered.

However, as will be apparent, the prioritizing techniques provided by the present invention assures that the most visually important objects are rendered first, according to the current position of the virtual camera. Thus, accordingly, objects that are not rendered during any particular frame rendering period are of less visual importance than those objects that have been rendered.

Figure 3:
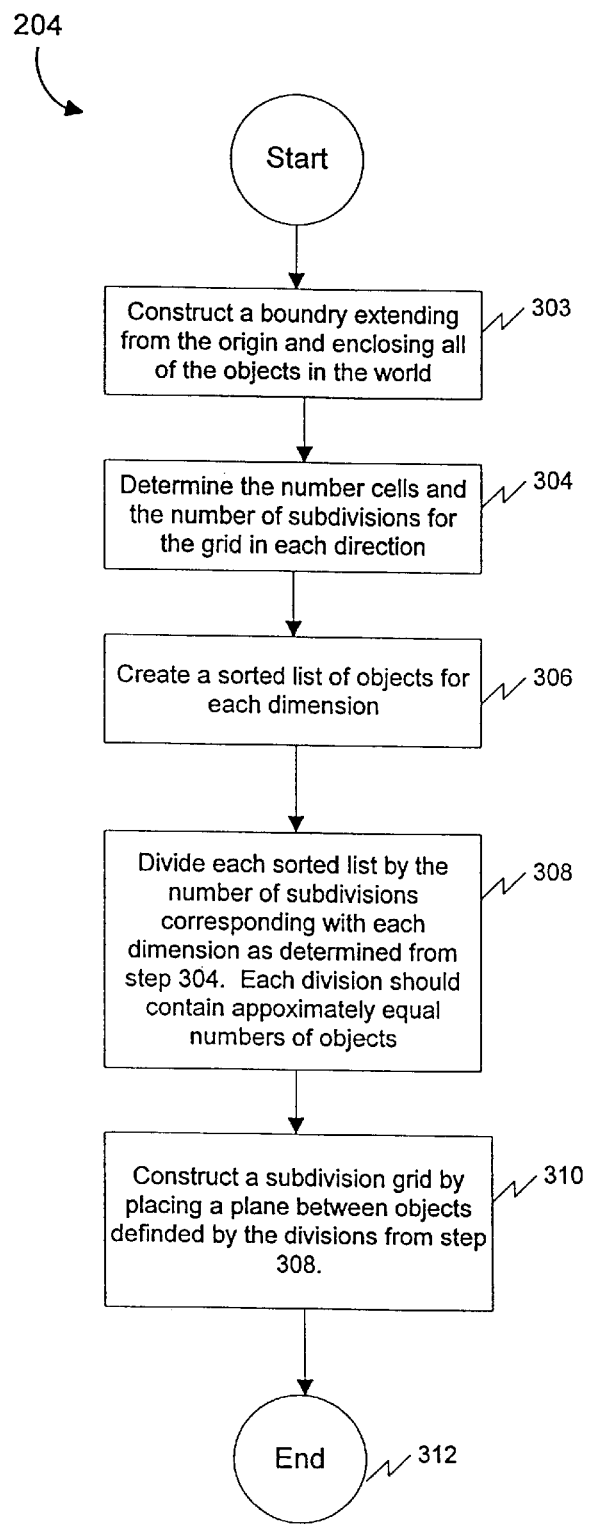
Figure 4:
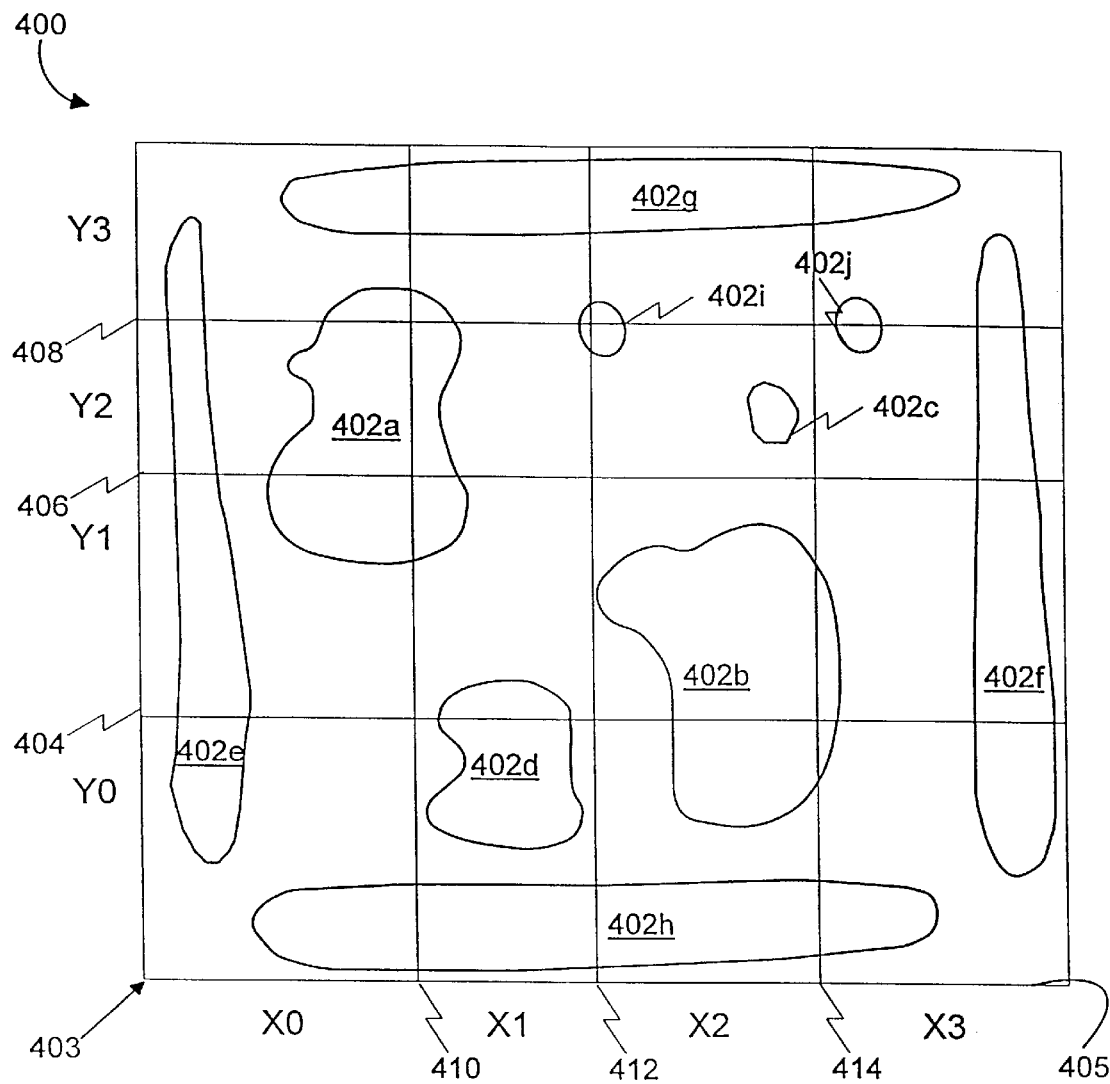
FIG. 4 is a block diagram depicting an example of a 2D subdivision grid superimposed upon a 2D world according to a preferred embodiment of the present invention.

An example of a process that can be used in step 204 for constructing a subdivision grid is illustrated in FIG. 3. In addition, FIG. 4 depicts an example of a 2D subdivision grid 400 that is superimposed upon a example 2D world according to the principles of the present invention.

Accordingly, the rectangle 405 is the boundary of the 2D world in the X and Y directions. In this example, the X direction extends from left to right, and the Y direction extends from bottom to top, as depicted by the cell labels X0, X1, X2, X3 and Y0, Y1, Y2 and Y3, respectively. Each cell in the matrix shown in FIG. 4 may be referred to herein by specifying the X and Y cell labels. For example, the object 402c is contained within the cell X2-Y2.

The 2D world comprises a plurality of objects, 402a, 402b, 402c, 402d, 402e, 402f, 402g, 402h, 402i and 402j (generally 402). As stated, each object 402 is a collection of polygons. More specifically, in VRML, an object is specifically defined as a particular pre-defined shape, such as a cube or a rectangle, or a group of shapes.

Referring back to FIG. 3, the process for constructing a subdivision grid begins with step 303. In step 303 a boundary 405 enclosing the world is constructed. The boundary 405 extends from the origin 403 of the world coordinate system and encloses all of the objects 402 comprising the world model.

In step 304, the number of cells and the number of subdivisions for the grid are determined. An example of a method that can be used to determine the number of subdivisions will now be described. First, an approximate total number of cells comprising the entire grid is estimated. In one embodiment of the present invention, it is desired to have approximately as many cells as there are objects in the world. Thus, because the world shown in FIG. 4 contains 10 objects 402, it is desired to have approximately 10 total cells in the subdivision grid. This number is used as a starting point to calculate the total number of cells, as described below.

After a starting point for the total number of cells is determined, that number is used to compute the division of cells in each dimension, and the total number of cells that is ultimately implemented to construct the grid 400. How the cells are divided among the various dimensions depends upon the relative extent of the world in each dimension. For example, if the X dimension of a world is very large compared to the Y and Z dimensions, more divisions are made along X direction than along Y or Z directions.

Accordingly, for the 2D example in FIG. 4, it is desired to construct a grid 400 with approximately 10 cells. Further, because the extent of the world in the X and Y directions are approximately equal, it is desired to have the same number of divisions, (N), in each direction.

Hence, in order to determine the number of subdivisions, and the total number of cells, the following equation is solved: N×N=10. Thus, $$N = \sqrt{10} = 3.16$$

The solution, 3.16, is then rounded up the nearest integer. Thus, a grid is constructed with 4 cells in each direction (X and Y), yielding a total of 16 cells.

In another example (not shown), suppose the size of a 2D world is longer in the Y direction by a factor of 2.7. Additionally suppose the world also contains 10 objects. In this case, following equation is solved: N×2.7N=10. Thus, $$N = \sqrt{\frac{10}{2.7}} = 1.9$$

The solution 1.9 is rounded up to the nearest integer. Thus, a grid is constructed with 2 cells (N) in the X direction, and 6 cells (2.7 N, rounded up) in the Y direction, for a total of 12 cells.

In yet another example, suppose the size of a 3D world is equal in all three directions (X, Y and Z) and the world contains 10 objects. In this case, the following equation is solved: N×N×N=10: Thus, $$N = \sqrt[3]{10} = 2.15$$

Figure 6:
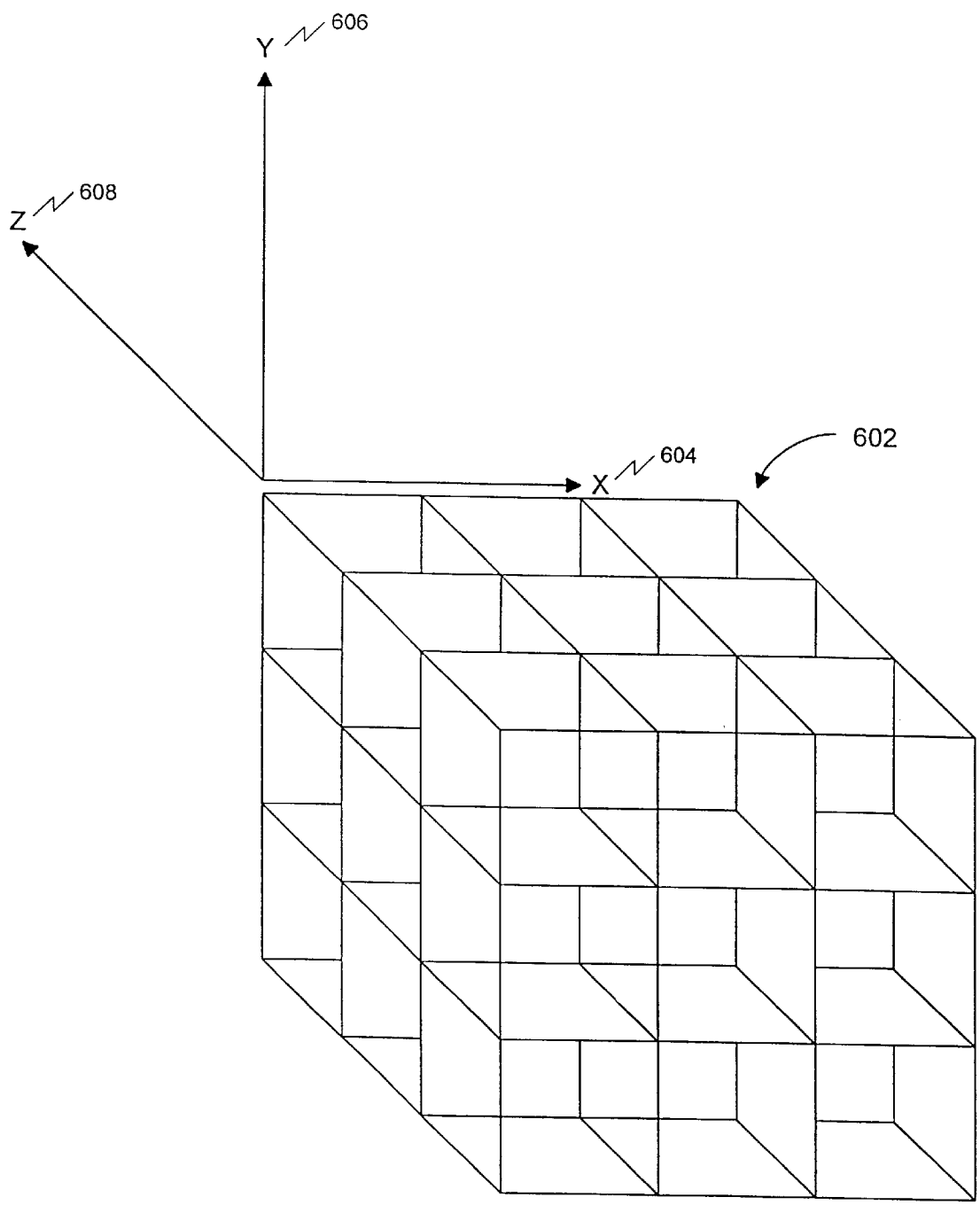
FIG. 6 is a block diagram depicting a 3D subdivision grid according to a preferred embodiment of the present invention.

The solution, 2.15 is rounded up to the nearest integer. Thus, a grid is constructed with 3 cells in each direction (X, Y and Z), for a total of 27 cells. An example of such a cell configuration is depicted in FIG. 6, which shows a 3×3×3 subdivision grid 602, that is constructed with 3 cells in each of the X 604, Y 606, and Z 608 directions.

Referring back to FIG. 3, after the total number of cells and the number of subdivisions in each direction is determined in step 304, control passes to step 306. In step 306, a sorted list of objects is created for each dimension. Each list comprises all of the objects in the world, sorted according to the distance of their center point relative a plane perpendicular to the axis associated with the particular dimension. Details depicting an example of a process for creating a sorted list in each dimension, are presented below with reference to FIGS. 8 and 9.

Once the sorted lists have been created in step 306, control passes to step 308. In step 308, each list is divided into a number of sections corresponding with the number of subdivisions for each dimension, as determined by step 304. Details depicting an example of a process for dividing the sorted lists into a number of sections is described below.

Next, in step 310, a subdivision grid is constructed by placing a plane (or in the case of a 2D world, a line) between the objects as defined by the divisions in the sorted lists from step 308, as described below.

Before, describing an example method to create the sorted lists as discussed with reference to step 306 above, it is helpful to describe an example of a 3D world and its coordinate system. Thus, a simple 3D world and its coordinate system is depicted in FIG. 8. The 3D world comprises a single object, a cube 814. The origin of the coordinate system 807 is the point in which the X, Y, and Z axises (802, 806 and 804, respectively), intersect.

The center of the cube is depicted by the smaller cube 816, which is actually a single point in 3D space having an X, Y and Z coordinate. The coordinates of the center point can determined by measuring its distance from the center point to a plane that is perpendicular to the axis associated with the particular dimension.

For example, in order to determine the X coordinate of the cube's center point 816, a line 820 is drawn and measured from the center point 816 to the plane 810. Note that the plane 810 extends in both the Y 806 and the Z 804 directions, but not in the X 802 direction. Planes having this orientation are hereinafter referred to as 'X-Planes.'

Similarly, in order to determine the Y coordinate of the cube's center point 816, a line 822 is drawn from the center point 816 to the plane 808. Note that the plane 808 extends in both the X 802 and Z 804 directions, but not in the Y 810 direction. Planes having this orientation are hereinafter referred to as 'Y-Planes.'

Likewise, in order to determine the Z coordinate of the cube's center point 816, a line 818 is drawn from the center point 816 to the plane 812. Note that the plane 812 extends in both the X 802 and Y 806 directions, but not in the Z 804 direction. Planes having this orientation are hereinafter referred to as 'Z-Planes.'

Thus, as stated in step 306 above, a sorted list of objects is created for each dimension. In case of a 2D world as shown in FIG. 4, two sorted lists of objects are created, one for the X dimension, and another for the Y dimension. As stated each list comprises all of the objects 402 in the world.

An example of a sorting method that can be used to implement step 306, will now be described with reference to FIG. 9. In FIG. 9, the 2D world 400 is superimposed on an X-plane 908 and a Y-Plane 906. The sorted list in the X dimension is created by sorting the objects 402 in increasing order according to the distance of their center point from the X-Plane 908.

This technique is conceptually illustrated in FIG. 9 by projecting the center point of each object 402, on the Y-Plane and measuring the distance of the projection to the X-Plane. For example, the center point 910 of the object 402e is projected on the Y-Plane 906, as shown by the projection 902a. Similarly, the center point 911 of the object 402a is projected on the Y-Plane 906, as shown by the projection 902b. Likewise the center point 912 of the object 402d is projected on the Y-Plane 906, as shown by the projection 902c. Each center point of the remaining objects are projected on the Y-Plane 906 in a similar fashion (not shown).

Sorting the objects in the X dimension is accomplished by measuring the distance of each projected point from the X-Plane and arranging the list of objects in increasing order according to this measurement. For example, the first object in the sorted list is the object 402e, as shown by the measurement represented by the arrow '1' at the projected point 902a. Similarly, the second object in the sorted list is the object 402a, as shown by the measurement represented by the arrow '2' at the projected point 902b. Likewise, the third object in the sorted list is the object 402d, as shown by the measurement represented by the arrow '3' at the projected point 902c. Thus, the complete X-dimension sorted list of objects is: 402e-402a-402d-402g-402h-402i-402b-402c-402j-402f.

Likewise, the objects in the Y direction are sorted in a similar fashion. That is, a list is created that comprises all of the objects 402 sorted from bottom to top. This technique is illustrated by the first three sorted objects, in a similar fashion as described above, for the sorted list of objects in the X direction. In this case, the center points 916, 912, and 914 are projected on the X-Plane 908, as seen the projections, 904a, 904b, and 904c. Thus, the result of the Y dimension sort is 402h-402d-402b-402e-402f-402a-402c-402i-402j-402g. Note that for a 3D world, this procedure would be repeated to create a Z dimension sorted list.

A method that can be used to divide each sorted list according to step 308, above, will now be described. Recall that it was determined in step 304, that for the example depicted in FIG. 4, a subdivision grid having 4 divisions in each of the X and the Y dimensions is desired. Thus, the X-sorted list and the Y-sorted list are each divided into 4 parts.

Further, it is desired to divide each sorted list such that approximately equal numbers of objects 402 appear in each subdivided list. In this way, the final subdivision grid will contain approximately equal numbers of objects in each cell. Thus, because 10 objects 402 appear in the world depicted in FIG. 4, 2 subdivided lists will comprise 2 objects, and the other two subdivided lists will comprise 3 objects. Any well known algorithm can be used to divide the lists using the criteria described herein. Such algorithms will be apparent to those skilled in the relevant art(s).

Thus, for example, suppose the above algorithm divides the sorted list in the X-dimension as follows:

| 402e-402a | 402d-102g-402h | 402i-402b-402c | 402j-402f | (1) | where the vertical line represents the list divisions. Further suppose the above algorithm divides the sorted list in the Y-dimension as follows:

| 402h-402d | 402b-402e-402f | 402a-402c-402i | 402j-402g | (2) |

Recall that in step 310, the subdivision grid is constructed by placing planes (or in case of a 2D world, lines) between objects according the divisions described above. Accordingly, to create the 2D subdivision grid shown in FIG. 4, for example, referring to the divided sorted list in the X-dimension (1) above, a vertical line 410 is placed between the center points of the objects 402a and 402d. Likewise, a vertical line is placed between the center points of the objects 402h and 402i. Similarly, a vertical line is placed between the center points of the objects 402c and 402j.

Next, referring to the divided sorted list in the Y-Dimension (2) above, a horizontal line 410 is placed between the center points of the objects 402a and 402d. Likewise, a vertical line is placed between the center points of the objects 402h and 402i. Similarly, a vertical line is placed between the center points of the objects 402c and 402j.

Note that in the case of a 3D world, the subdivision grid is divided in the X-dimension by placing bounded X-Planes between the center points of objects, as described above. Similarly, the subdivision grid is divided in the Y-dimension by placing bounded Y-Planes between the center points of objects in the divided sorted list, as described above. In addition, the subdivision grid is divided in the Z-dimension by placing bounded Z-Planes between the center points of objects in the divided sorted list. In each case, the plane is bounded by the boundary of the 3D world, as previously described.

When all of the subdivision planes are positioned, the completed subdivision grid is comprised of individual rectangular cells, such as the cell X0-Y0.

A method for creating and assigning values to the array according to steps 206 and 208 will now be described. Each element in the array corresponds with one cell, such as the cell X0-Y0 in FIG. 4. Further, each element in the array constructed in step 206, is assigned a list. Each list comprises all of the objects that are at least partially contained in the corresponding cell within the subdivision grid 400.

For the example the array element corresponding to cell X0-Y0, contains a list comprising the elements 402e and 404h. Similarly, the array element corresponding with the cell X1-Y0, contains a list comprising the elements 402d and 402h. Each of the remaining 14 array elements comprise a list of each of the objects that are contained in the corresponding cell.

Note that a particular object can appear in one or more lists. For example, the object 402h appears in four lists (i.e. the lists corresponding with the cells X0-Y0, X1-Y0, X2-Y0, and X3-Y0). Determining which cells contain which objects can be done quite quickly by considering the bounding box of each object instead of the actual polygons of the object. The specific technique to determine which cells contain which objects will be apparent to those skilled in the relevant art(s).

Also note that for a 2D world, a 2D array is constructed, and for a 3D world, a 3D array is constructed. Further, note that a 2D or 3D array can be represented using sparse matrix techniques, thereby reducing the amount of storage needed. In typical 3D world, many cells within the subdivision grid are empty. For example, when modeling a room, objects tend to cluster along the walls. Thus, many cells that represent the middle of the room are empty. Thus, sparse matrix techniques can be used to reduce the amount of storage needed for the array type data structure of the present invention.

Additionally, note that large objects are contained in several cells. This is a beneficial feature of the present invention because, as described below, if any of the cells containing a large object is processed, the entire object is rendered, even though it may extend beyond the boundary of the particular cell being processed. Thus, large objects like floors and walls which lend important perceptual clues to the user, are more likely to be drawn earlier than smaller less important objects.

Once the subdivision grid and array are constructed in steps 204 and 208, they are used in each frame period to determine the order in which the objects in the world are rendered as described below. Note that a frame period is an amount of time that is allocated for rendering a particular frame. Each implementation of the present invention will typically define a minimum acceptable frame rate, which yields a maximum frame period. The frame rate is the number of frames rendered on the display device every second. For example, a typical acceptable frame rate for an implementation of a VRML browser, is about 10 frames per second (10 fps). Thus, in this example, each frame must be rendered within 100 ms, the maximum frame period. Generally, anything below 10 fps will not provide the illusion of fluid motion and it is generally undesirable to drop below the minimum frame rate.

An example of a method that can be used to determine the next cell to be rendered, according to step 214, will now be described. As stated, the determination of the next cell to be rendered depends on the specific implementation of the present invention. In one embodiment, a procedure that can be used to determine the next cell to be rendered is described below.

Accordingly, the first objects that are rendered are those within the list of the array element associated with the first cell that the ray intersects. Note that for simplicity, objects within a list of an array element associated with a particular cell in the subdivision grid 400, are described as objects within a particular cell. For example, the second set of objects that are rendered are objects within the second cell in which the ray intersects. Objects are rendered in this fashion until objects within all cells that directly intercept the ray are rendered.

Next, the process begins rendering the cells that are one cell away from the viewing ray, followed by those that are two cells away, etc. An example of this process is described below with reference to FIG. 5.

Figure 5:
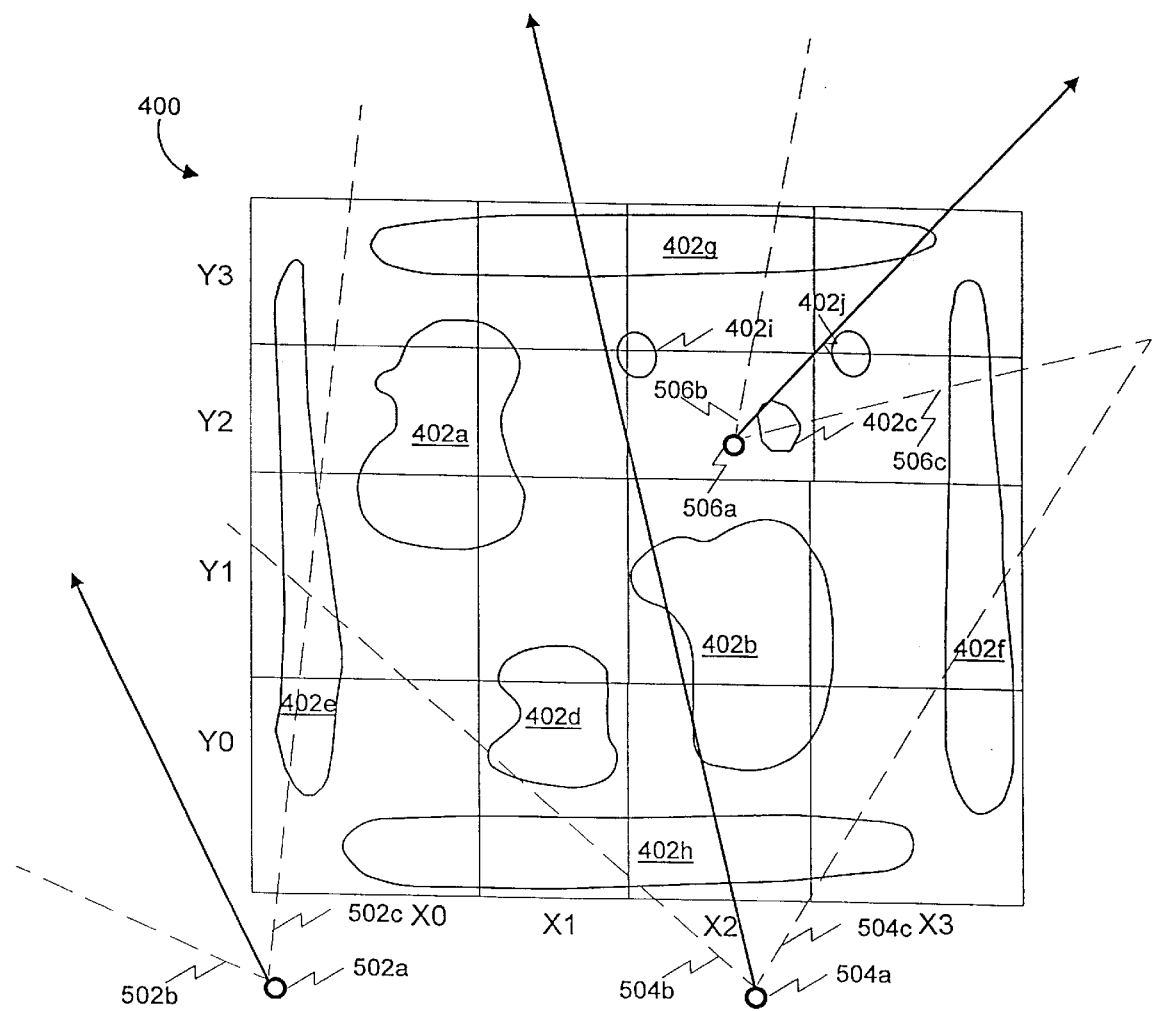
FIG. 5 is a block diagram depicting viewing rays superimposed on a subdivision grid according to a preferred embodiment of the present invention.

FIG. 5 contains the same 2D world and subdivision grid as shown in FIG. 4, superimposed with three viewing rays 502a, 504a, and 506a. The following discussion relates to the viewing ray 504a. The ray 504a originates outside of the subdivision grid. Further the ray 504a comprises a first viewing boundary 504b and a second viewing boundary 504c. The viewing boundaries 504b and 504c define the field of view of the virtual camera.

An example of a process to render cells according to a preferred embodiment of the present invention will now be described with reference to the viewing ray 504a. The first cell ray 504a intersects is the cell X2-Y0. Thus, the objects contained in that cell, namely 402b and 402h, are rendered first. Next the ray 504a intersects cell X2-Y1. Because object 402b has already been rendered, no new objects are rendered for this cell and the next cell is processed. The next cell ray 504a intersects is the cell X2-Y2. This results in the rendering of objects 402c and 402i. Next, cell X1-Y2 is processed, resulting in rendering of the object 402a. Finally, cell X1-Y3 is processed, resulting in rendering object 402g.

Note that at this point, all objects contained in cells along the line of sight have been rendered. The next objects to be rendered are those that appear in cells one unit away from the viewing ray, beginning with the first cell which is intersected by the viewing ray 504a. In one implementation of the present invention, an ordered list of cells along the viewing is kept in storage to help determine which cells are one unit away.

Thus, starting with the first cell hit (X2-Y0), as described above, cells that are one unit away in each direction is rendered. Hence, the cells X1-Y0 and X3-Y0 are processed. In processing cell X1-Y0, it is noted that the object 402h had already been rendered during the processing of cell X2-Y0. Thus, only object 402d is rendered. Likewise, during the processing for cell X3-Y0 it is noted that the object 402h had already been rendered. Thus, only the object 402f is rendered. Also note that cell X2-Y1 is not rendered because it has already been rendered because it lies along the viewing ray 504a.

In addition it should be appreciated that in the case of 3D worlds, the cells that are one unit away from the cell X2-Y0 in the Z dimension would also be rendered.

Next, the cells one unit away from the next cell along the viewing ray (i.e., the cell X2-Y1) are rendered. This results in the rendering of cells X1-Y1 and X3-Y1. In this case, all the objects in those cells have already been rendered. Cells X2-Y2 and X2-Y0 are not rendered as they lie along the viewing ray. Next, the rendering continues with the cells one unit away from the viewing ray until we the end of the viewing ray is reached, in this case, with the cell X1-Y3.

After all cells that are one unit away from the viewing ray 504a have been rendered, the process goes back to the beginning and renders cells that are displaced from the viewing ray a distance of two units away. After all cells have been rendered at a displacement of two units, cells are rendered at a displacement of three units away, four units away, etc.

Thus, the next cell in step 214, refers to the next cell as described by the above process. As stated, this process continues until all objects are rendered (step 214), or the frame rendering period has expired (step 212), or all cells within the viewing angle have been processed (step 215). In any case, the process then continues with step 210 where the next frame is rendered.

In addition to the case just described, wherein a viewing ray originates outside of the subdivision grid 400 and intersects the subdivision grid 400, such as the ray 504a, two other cases are worth noting. The first case illustrates the property that cells which lie outside of the viewer's field of view need not be rendered. For example, as shown in FIG. 5, the ray 506a originates inside the subdivision grid 400. The field of view associated with the ray 506a is indicated by dotted lines 506b and 506c. In this case, it is not necessary to render cells that lie below or to the left of the field of view. A test to determine cells that are outside of the field of view can be efficiently performed using well known geometric calculations.

The second noteworthy case is when the viewing ray does not intersect the subdivision grid 400 at all. For example, the ray 502a does not intersect the subdivision grid 400. Thus, the entire scene lies in the periphery of the view of the virtual camera. Still, some of the objects in the world, namely the objects that lie within the cells X0-Y0, X0-Y1, X0-Y2 and X0-Y3 are nonetheless within the field of view. In this case, the process described above should be modified by first finding the cell of the grid that lies closest to the viewing ray, then proceed by rendering cells one unit away from that cell, then those two units away, etc. For example, for the ray 502a, the process begins by rendering the cell X0-Y0, then the cell X0-Y1, etc.

Further, for subdivision grids having a very large number of cells, it may be beneficial to modify the process described above. For example, it would likely be more efficient to not render the cells along the entire length of the ray before beginning to render the cells one unit away from the starting cell. This is so, because the cells one unit away from the first cell are significantly closer and cover more screen area than those far away. Thus, if objects are rendered all the way to the end of the viewing ray first, there may not be enough time left to render objects closer to the viewer that take up large areas of the screen. Thus, several different methods may be used to modify the process as described above.

Additionally, the above process renders each frame independently, it is possible that certain objects will flash off and on each frame. This problem can be solved using a technique to introduce some hysteresis into the process. For example, by keeping track of which objects are rendered and making sure that if an object is rendered once, it must be rendered for at least some fixed number of frames thereafter. Similarly, if an object is not rendered, it should not be rendered until a certain number of frames have elapsed. This eliminates most of the flashing and increases the coherence from one frame to the next.

Additionally, the subdivision grid 400 can be built incrementally as Inlined portions of the world are loaded. A subdivision grid 400 may be constructed for each Inlined portion. When it is determined that an Inlined portion should be rendered, a recursive instance of the ray casting process may be used to determine the order in which the objects inside the Inline should be drawn.

Figure 7:
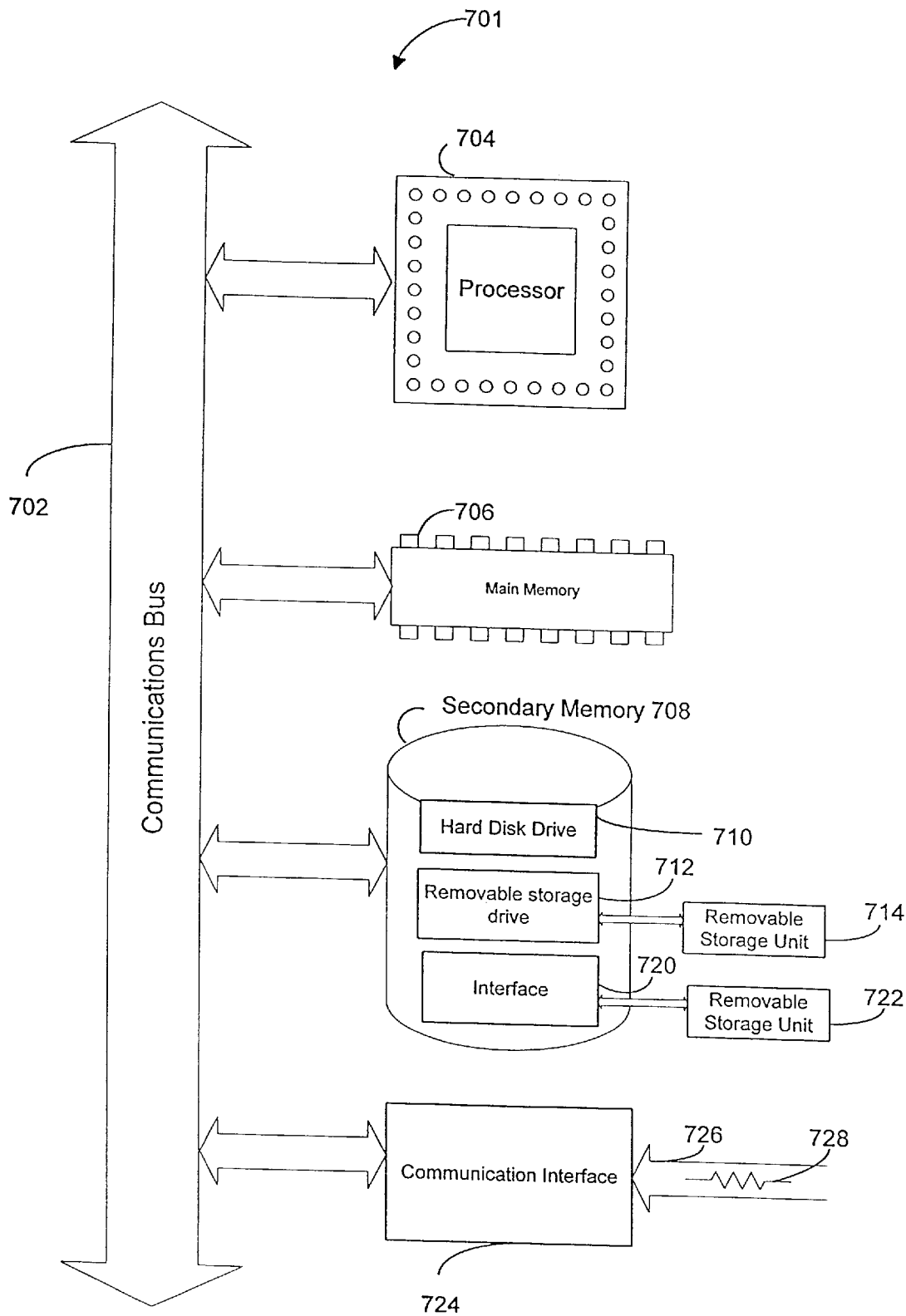
FIG. 7 is a block diagram depicting an example computer useful for implementing a preferred embodiment of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 701 is shown in FIG. 7. The computer system 701 includes one or more processors, such as processor 704. The processor 704 is connected to a communication bus 702. Various software embodiments are described in terms of this example computer system. After reading this description, it will become apparent to a person skilled in the relevant art how to implement the invention using other computer systems and/or computer architectures.

Computer system 702 also includes a main memory 706, preferably random access memory (RAM), and can also include a secondary memory 708. The secondary memory 708 can include, for example, a hard disk drive 710 and/or a removable storage drive 712, representing a floppy disk drive, a magnetic tape drive, an optical disk drive, etc. The removable storage drive 712 reads from and/or writes to a removable storage unit 714 in a well known manner. Removable storage unit 714, represents a floppy disk, magnetic tape, optical disk, etc. which is read by and written to by removable storage drive 712. As will be appreciated, the removable storage unit 714 includes a computer usable storage medium having stored therein computer software and/or data.

In alternative embodiments, secondary memory 708 may include other similar means for allowing computer programs or other instructions to be loaded into computer system 701. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 701.

Computer system 701 can also include a communications interface 724. Communications interface 724 allows software and data to be transferred between computer system 701 and external devices. Examples of communications interface 724 can include a modem, a network interface (such as an Ethernet card), a communications port, a PCMCIA slot and card, etc. Software and data transferred via communications interface 724 are in the form of signals which can be electronic, electromagnetic, optical or other signals capable of being received by communications interface 724. These signals 726 are provided to communications interface via a channel 728. This channel 728 carries signals 726 and can be implemented using wire or cable, fiber optics, a phone line, a cellular phone link, an RF link and other communications channels.

In this document, the terms "computer program medium" and "computer usable medium" are used to generally refer to media such as removable storage device 712, a hard disk installed in hard disk drive 710, and signals 726. These computer program products are means for providing software to computer system 701.

Computer programs (also called computer control logic) are stored in main memory and/or secondary memory 708. Computer programs can also be received via communications interface 724. Such computer programs, when executed, enable the computer system 701 to perform the features of the present invention as discussed herein. In particular, the computer programs, when executed, enable the processor 704 to perform the features of the present invention. Accordingly, such computer programs represent controllers of the computer system 701.

In an embodiment where the invention is implemented using software, the software may be stored in a computer program product and loaded into computer system 701 using removable storage drive 712, hard drive 710 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A process for optimizing rendering of polygonal data, representing a three dimensional world capable of being viewed by a user from the viewpoint of a virtual camera, said process comprising the steps of:

constructing a ray having an orientation coinciding with the orientation of the viewpoint of the virtual camera;

prioritizing objects to be rendered according to each of said objects displacement from said ray; and rendering said objects according to a priority from said prioritizing step.

2. The process of claim 1, further comprising the step of specifying a maximum amount of time in which to render a single frame.

3. The process of claim 2, further comprising the step of repeating said steps of prioritizing and rendering until all said objects that are viewable have been rendered or said maximum amount of time has expired.

4. The process of claim 3, further comprising the step of repeating said process for each frame rendered.

5. The process of claim 1, wherein said prioritizing step includes the steps of:

constructing a subdivision grid comprising a plurality of cells superimposed upon said three dimensional world and;

prioritizing said objects to be rendered based on each of said objects position within said subdivision grid.

6. The process of claim 3, wherein said steps of prioritizing and rendering comprise the steps of:

(a) creating an ordered cell list comprising cells that are intersected by said ray;

(b) rendering said objects that are within at least one cell according to the order and identification of cells as defined by said ordered cell list; and (c) rendering said objects that are displaced a predetermined number of cells in each direction from each cell comprising said ordered cell list.

7. The process of claim 6 further comprising the step of repeating said process, wherein said predetermined number of cells is one the first time step (c) is processed and is incremented upon each subsequent processing of step (c).

8. A process for optimizing the rendering of polygonal data representing a three dimensional (3D) world having a 3D coordinate system and comprising 3D objects having up to three dimensions, said 3D world capable of being viewed by a user from the viewpoint of a virtual camera, said process comprising the steps of:

constructing a 3D boundary that encloses one or more objects in the 3D world;

creating at least one sorted list of objects comprising the objects enclosed by said boundary, wherein each said sorted list corresponds with a particular dimension or the 3D world;

constructing a subdivision grid according to said sorted list comprising a plurality of 3D cells; and prioritizing objects within said 3D cells to be rendered according the position of said 3D cells relative to the virtual camera.

9. The process of claim 8, further comprising the step of rendering objects according to the priority of said 3D cells determined in said prioritizing step.

10. The process of claim 9, further comprising the step of repeating said prioritizing and rendering steps until all objects have been rendered.

11. The process of claim 9, further comprising the step of repeating said prioritizing and rendering steps until all viewable objects have been rendered.

12. The process of claim 9, further comprising the steps of:

specifying a maximum amount of time in which to render a single frame;

repeating said prioritizing and rendering steps until said maximum amount of time has expired.

13. The process of claim 8, further comprising the step of creating a 3D array of elements, wherein each element corresponds to one said 3D cell and comprises a list of objects within the corresponding 3D cell.

14. The process of claim 8, further comprising the step of constructing a ray within the 3D world, the orientation of said ray coinciding with the orientation of the viewpoint of the virtual camera.

15. The process of claim 8, wherein said 3D boundary has a generally rectangular shape in each dimension.

16. The process of claim 8, wherein said 3D boundary extends from the origin of the 3D coordinate system.

17. The process of claim 8, wherein said sorted list of objects is sorted according to the distance of each object relative to a predetermined point in the 3D coordinate system.

18. The process of claim 8, wherein said step of constructing a subdivision grid comprises the steps of:

dividing each said sorted list into a number of sublists, thereby creating a divider between said sublists; and placing subdivision planes within said 3D boundary in each dimension, wherein each said subdivision plane is placed between a pair of objects separated by said dividers.

19. The process of claim 18, wherein said number of sublists is proportional to the spatial extent of the 3D world in the corresponding dimension of said sorted list, relative to the extent of the 3D world in the other dimensions.

20. The process of claim 18, wherein each said sub-list comprises substantially equal numbers of objects.

21. The process of claim 18, wherein each said subdivision plane is placed between the center points of each said pair of objects.

22. The process of claim 14, further comprising the step of prioritizing objects to be rendered according the displacement of said objects from said ray.

23. The process of claim 22, further comprising the steps of:

creating a 3D array of elements, wherein each element corresponds to one said 3D cell and comprises a list of objects within the corresponding 3D cell;

rendering objects according to the priority of said 3D cells from said prioritizing step; and repeating said prioritizing and rendering steps until all objects or all viewable objects have been rendered, or the time to render a single frame has expired.

24. The process of claim 21, wherein said prioritizing and rendering steps further comprise the steps of:

(a) creating an ordered cell list comprising cells that are intersected by said ray;

(b) rendering the objects within each particular cell according to said ordered cell list, said objects being selected according to said list of objects in said 3D array element corresponding with said particular cell being rendered; and (c) rendering objects displaced a predetermined number of cells in each direction from each cell rendered in step (b), wherein said predetermined number of cells is 1 the first time step (c) is processed and is incremented upon each subsequent processing of step (c).

25. A system for optimizing the rendering of polygonal data representing a three dimensional (3D) world having a 3D coordinate system and comprising 3D objects having up to three dimensions, said 3D world capable of being viewed by a user from the viewpoint of a virtual camera, said system comprising:

boundary construction means for constructing a 3D boundary that encloses one or more objects in the 3D world;

list creation means for creating at least one sorted list of objects comprising the objects enclosed by said boundary, wherein each said sorted list corresponds with a particular dimension or the 3D world;

grid construction means for constructing a subdivision grid according to said sorted list comprising a plurality of 3D cells; and prioritizing means for prioritizing objects within said 3D cells to be rendered according the position of said 3D cells relative to the virtual camera.

26. The system of claim 25, further comprising a means for specifying a maximum amount of time in which to render a single frame.

27. The system of claim 25, further comprising rendering means for rendering objects according to the priority of said 3D cells determined from said prioritizing means.

28. The system of claim 26, further comprising means for repeating the operation of said prioritizing and rendering means until said maximum amount of time to render a single frame has expired.

29. A computer program product comprising a computer useable medium having computer program logic stored therein said computer program logic for enabling a computer to optimize rendering of polygonal data representing a three dimensional (3D) world having a 3D coordinate system and comprising 3D objects having up to three dimensions, said 3D world capable of being viewed by a user from the viewpoint of a virtual camera, wherein said computer program logic comprises:

first constructing means for enabling the computer to construct a 3D boundary that encloses one or more objects in the 3D world;

creating means for enabling the computer to create at least one sorted list of objects comprising the objects enclosed by said boundary, wherein each said sorted list corresponds with a particular dimension or the 3D world;

second constructing means for enabling the computer to construct a subdivision grid according to said sorted list comprising a plurality of 3D cells; and prioritizing means for enabling the computer to prioritize objects within said 3D cells to be rendered according the position of said 3D cells relative to the virtual camera.

30. The computer-program product of claim 29, further comprising means for enabling the computer to specify a maximum amount of time in which to render a single frame.

31. The computer program-product of claim 29, further comprising means for enabling the computer to render objects according to the priority of said 3D cells determined [in] by said prioritizing means.

32. The computer program-product of claim 30, further comprising means for enabling the computer to repeat said prioritizing and rendering means until said maximum time to render a single frame has expired.

* * * * *